(12) United States Patent
Nowatzyk et al.

(10) Patent No.: US 11,468,639 B2
(45) Date of Patent: Oct. 11, 2022

(54) SELECTIVE OCCLUSION SYSTEM FOR AUGMENTED REALITY DEVICES

(71) Applicant: Microsoft Technology Licensing, LLC, Redmond, WA (US)

(72) Inventors: Andreas G. Nowatzyk, San Jose, CA (US); Joel Pritchett, Duvall, WA (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 14/628,099

(22) Filed: Feb. 20, 2015

(65) Prior Publication Data
US 2016/0247319 A1 Aug. 25, 2016

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ....... G06T 15/04; G06T 15/50; G06T 19/006; G02B 27/0172; G02B 27/017; G02B 2027/0138; G02B 2027/0141; G02B 2027/0178; G02B 2027/0187; G02F 1/133528; G02F 2001/133541;
(Continued)

(56) References Cited

U.S. PATENT DOCUMENTS

| 4,385,806 A | * | 5/1983 | Fergason | G02F 1/13363 349/102 |
| 4,566,758 A | * | 1/1986 | Bos | G02F 1/1395 349/128 |

(Continued)

FOREIGN PATENT DOCUMENTS

CN 103472909 A 12/2013

OTHER PUBLICATIONS

Maimone, et al., "Computational Augmented Reality Eyeglasses", In Proceedings of IEEE International Symposium on Mixed and Augmented Reality, Oct. 1, 2013, 10 pages.
(Continued)

*Primary Examiner* — Charles L Beard
(74) *Attorney, Agent, or Firm* — Alleman Hall Creasman & Tuttle LLP

(57) ABSTRACT

A near-eye display system includes a see-through display, an image source, a background light sensor, a selective background occluder including a first liquid crystal panel and a second liquid crystal panel positioned between a pair of polarizers, and a computing device including instructions executable by a logic subsystem to determine a shape and a position of an occlusion area based upon a virtual object to be displayed, obtain a first and a second birefringence pattern for the first and the second liquid crystal panels, produce the occlusion area by applying the birefringence patterns to the liquid crystal panels, and display the virtual object in a location visually overlapping with the occlusion area.

20 Claims, 12 Drawing Sheets

(51) Int. Cl.
  *G02B 27/01* (2006.01)
  *G02F 1/1335* (2006.01)
  *G06T 15/50* (2011.01)
(52) U.S. Cl.
  CPC ........ *G02F 1/133528* (2013.01); *G06F 3/011* (2013.01); *G06T 15/50* (2013.01); *G02B 2027/0138* (2013.01); *G02B 2027/0141* (2013.01); *G02B 2027/0178* (2013.01); *G02B 2027/0187* (2013.01)
(58) Field of Classification Search
  CPC ... G02F 2001/133538; G02F 1/133533; G02F 3/011
  See application file for complete search history.

(56) References Cited

U.S. PATENT DOCUMENTS

| | | | | |
|---|---|---|---|---|
| 4,582,396 | A * | 4/1986 | Bos | G02F 1/1395 345/697 |
| 4,808,978 | A * | 2/1989 | Vernay | G02B 27/0101 340/980 |
| 5,343,313 | A * | 8/1994 | Fergason | G02B 27/017 349/87 |
| 5,870,097 | A * | 2/1999 | Snyder | G06T 11/001 345/422 |
| 5,940,150 | A * | 8/1999 | Faris | B82Y 15/00 349/115 |
| 6,055,104 | A * | 4/2000 | Cheng | G02B 6/266 359/484.08 |
| 6,064,423 | A * | 5/2000 | Geng | G02B 27/2292 345/32 |
| 6,417,969 | B1 * | 7/2002 | DeLuca | G02B 27/2235 345/8 |
| 6,519,022 | B1 * | 2/2003 | Xu | G02B 6/272 349/196 |
| 6,559,813 | B1 * | 5/2003 | DeLuca | G02B 27/22 345/629 |
| 6,624,859 | B1 * | 9/2003 | Sugiyama | G02B 5/3083 252/585 |
| 6,633,358 | B1 * | 10/2003 | Kwok | G01N 21/21 349/136 |
| 6,710,831 | B1 * | 3/2004 | Winker | G02F 1/133553 349/115 |
| 6,864,927 | B1 * | 3/2005 | Cathey | G02B 27/01 349/11 |
| 6,980,697 | B1 * | 12/2005 | Basso | G06T 7/2033 348/14.01 |
| 7,053,865 | B2 * | 5/2006 | Takahashi | G02B 27/225 345/7 |
| 7,190,518 | B1 * | 3/2007 | Kleinberger | G02B 30/25 348/57 |
| 7,419,265 | B2 * | 9/2008 | Relke | H04N 13/359 348/E13.043 |
| 7,639,208 | B1 * | 12/2009 | Ha | G02B 27/0172 345/204 |
| 8,223,089 | B2 * | 7/2012 | Kusuno | H04N 13/351 345/32 |
| 8,537,075 | B2 * | 9/2013 | Crocco | G09G 5/00 345/7 |
| 8,589,822 | B2 * | 11/2013 | Bell | G02B 27/2228 715/801 |
| 9,142,185 | B2 * | 9/2015 | Fateh | G06T 11/206 |
| 9,310,610 | B2 * | 4/2016 | Border | G02B 27/0093 |
| 9,311,751 | B2 * | 4/2016 | Lamb | G09G 3/003 |
| 9,363,504 | B2 * | 6/2016 | Cha | H04N 13/359 |
| 9,479,767 | B2 * | 10/2016 | Van Der Horst | H04N 13/359 |
| 9,575,336 | B1 * | 2/2017 | Cao | G02F 1/0136 |
| 9,721,045 | B2 * | 8/2017 | Arrighi | G06F 3/04815 |
| 10,191,296 | B1 * | 1/2019 | Tabirian | G02B 27/20 |
| 2002/0131755 | A1 * | 9/2002 | Liu | G02F 1/09 385/140 |
| 2002/0154070 | A1 * | 10/2002 | Sato | H04N 5/2224 348/E5.022 |
| 2002/0154215 | A1 * | 10/2002 | Schechterman | G02B 27/017 348/51 |
| 2002/0167511 | A1 * | 11/2002 | Kim | G09G 3/3648 345/211 |
| 2003/0035605 | A1 * | 2/2003 | Bouevitch | G02B 6/2766 385/1 |
| 2003/0063236 | A1 * | 4/2003 | Watson | G02B 5/3016 349/96 |
| 2003/0071973 | A1 * | 4/2003 | Hansen | G02B 5/3058 353/20 |
| 2003/0095092 | A1 * | 5/2003 | Kume | G02F 1/13471 345/87 |
| 2003/0193642 | A1 * | 10/2003 | Tominaga | G02F 1/133382 349/196 |
| 2003/0231270 | A1 * | 12/2003 | Kume | H04N 9/3108 349/119 |
| 2004/0135955 | A1 * | 7/2004 | Hong | G02F 1/134363 349/141 |
| 2005/0018204 | A1 * | 1/2005 | Li | G01D 5/344 356/493 |
| 2006/0023143 | A1 * | 2/2006 | Lee | G02B 27/26 349/102 |
| 2006/0115082 | A1 * | 6/2006 | Kevenaar | G07D 7/0053 380/216 |
| 2007/0035830 | A1 * | 2/2007 | Matveev | G02B 27/2228 359/464 |
| 2007/0159671 | A1 * | 7/2007 | Hoshino | G02B 5/3016 359/2 |
| 2007/0296889 | A1 * | 12/2007 | Struyk | G02F 1/133528 349/96 |
| 2008/0024700 | A1 * | 1/2008 | Yoshimi | G02F 1/13363 349/96 |
| 2008/0117231 | A1 * | 5/2008 | Kimpe | G09G 3/20 345/629 |
| 2008/0259012 | A1 * | 10/2008 | Fergason | G02B 27/017 345/89 |
| 2009/0242834 | A1 * | 10/2009 | Hoshino | B41M 3/14 252/299.7 |
| 2010/0046049 | A1 * | 2/2010 | Kroll | G03H 1/02 359/9 |
| 2010/0046050 | A1 * | 2/2010 | Kroll | G03H 1/02 359/9 |
| 2010/0097439 | A1 * | 4/2010 | Kroll | G03H 1/0005 348/14.02 |
| 2010/0103485 | A1 * | 4/2010 | Haussler | G03H 1/02 359/9 |
| 2010/0149618 | A1 * | 6/2010 | Sprague | G02B 27/0172 359/259 |
| 2010/0165258 | A1 * | 7/2010 | Hamada | G02F 1/133636 349/76 |
| 2010/0265420 | A1 * | 10/2010 | Lescure | G02B 27/48 349/10 |
| 2010/0302356 | A1 * | 12/2010 | Sinivaara | G02B 27/017 348/E5.09 |
| 2011/0075265 | A1 * | 3/2011 | Alekseyev-Popov | A42B 3/226 359/630 |
| 2012/0001954 | A1 * | 1/2012 | Yamazaki | G09G 3/3406 345/690 |
| 2012/0068913 | A1 * | 3/2012 | Bar-Zeev | G02B 26/026 345/8 |
| 2012/0075540 | A1 * | 3/2012 | Chen | G02B 27/26 349/15 |
| 2012/0092328 | A1 * | 4/2012 | Flaks | G06V 20/10 345/419 |
| 2012/0105473 | A1 * | 5/2012 | Bar-Zeev | G06T 1/20 345/633 |
| 2012/0127284 | A1 * | 5/2012 | Bar-Zeev | G02B 27/017 348/53 |
| 2012/0154277 | A1 * | 6/2012 | Bar-Zeev | G02B 27/017 345/158 |
| 2012/0154557 | A1 * | 6/2012 | Perez | H04N 21/25891 348/53 |

(56) References Cited

U.S. PATENT DOCUMENTS

| | | | |
|---|---|---|---|
| 2012/0206452 A1* | 8/2012 | Geisner | G06V 10/26 345/419 |
| 2012/0229431 A1* | 9/2012 | Hiroki | G09G 3/003 345/204 |
| 2012/0293548 A1* | 11/2012 | Perez | G06F 3/012 345/633 |
| 2012/0326948 A1* | 12/2012 | Crocco | G09G 5/00 345/7 |
| 2013/0003163 A1* | 1/2013 | Nowatzyk | G02F 1/167 359/296 |
| 2013/0027656 A1* | 1/2013 | Escuti | G02B 5/3083 349/193 |
| 2013/0042296 A1* | 2/2013 | Hastings | G06F 21/10 726/1 |
| 2013/0083011 A1* | 4/2013 | Geisner | G09G 5/00 345/419 |
| 2013/0083173 A1* | 4/2013 | Geisner | G02B 27/017 348/51 |
| 2013/0106922 A1* | 5/2013 | Chen | G02F 1/13306 359/240 |
| 2013/0113973 A1* | 5/2013 | Miao | G09G 3/003 348/333.01 |
| 2013/0117377 A1* | 5/2013 | Miller | H04L 67/38 709/205 |
| 2013/0128230 A1 | 5/2013 | Macnamara | |
| 2013/0141419 A1 | 6/2013 | Mount et al. | |
| 2013/0147685 A1* | 6/2013 | Gupta | G02B 5/02 345/8 |
| 2013/0155352 A1* | 6/2013 | Wicker | G02F 1/133528 349/96 |
| 2013/0169603 A1* | 7/2013 | Bae | G09G 5/005 345/204 |
| 2013/0169766 A1* | 7/2013 | Shin | H04N 13/0438 348/55 |
| 2013/0170031 A1* | 7/2013 | Bohn | G02B 27/2242 359/480 |
| 2013/0207964 A1* | 8/2013 | Fleck | H01L 27/156 345/419 |
| 2013/0208014 A1* | 8/2013 | Fleck | G06K 9/00684 345/672 |
| 2013/0208482 A1* | 8/2013 | Fleck | G02B 27/017 362/293 |
| 2013/0242056 A1* | 9/2013 | Fleck | H04N 13/044 348/47 |
| 2013/0285885 A1* | 10/2013 | Nowatzyk | G02B 3/0006 345/8 |
| 2013/0286053 A1* | 10/2013 | Fleck | G09G 3/3208 345/690 |
| 2013/0293793 A1* | 11/2013 | Lu | G02B 27/2214 349/15 |
| 2013/0293940 A1* | 11/2013 | Kroll | G03H 1/2645 359/9 |
| 2013/0328762 A1* | 12/2013 | McCulloch | G02B 27/017 345/156 |
| 2013/0335671 A1* | 12/2013 | Fleck | G02B 27/017 349/62 |
| 2013/0335683 A1* | 12/2013 | Escuti | G02F 1/133528 349/96 |
| 2014/0002444 A1* | 1/2014 | Bennett | G06T 19/006 345/419 |
| 2014/0028815 A1* | 1/2014 | Atkins | H04N 13/341 348/58 |
| 2014/0035959 A1* | 2/2014 | Lapstun | H04N 13/0402 345/690 |
| 2014/0132849 A1* | 5/2014 | Ide | G02F 1/13 349/1 |
| 2014/0168035 A1* | 6/2014 | Luebke | G02B 27/017 345/8 |
| 2014/0168783 A1* | 6/2014 | Luebke | G02B 27/017 359/630 |
| 2014/0185142 A1* | 7/2014 | Gupta | G02B 27/1086 359/630 |
| 2014/0192174 A1* | 7/2014 | Park | H04N 13/356 348/56 |
| 2014/0192280 A1* | 7/2014 | He | H04N 13/0434 349/13 |
| 2014/0253816 A1* | 9/2014 | Shin | H04N 5/4403 348/734 |
| 2014/0254024 A1* | 9/2014 | Hiraide | G02B 27/0172 359/633 |
| 2014/0266986 A1* | 9/2014 | Magyari | G02B 27/0172 345/8 |
| 2014/0272322 A1* | 9/2014 | Lee | B05B 12/20 428/192 |
| 2014/0285429 A1* | 9/2014 | Simmons | G02B 27/225 345/156 |
| 2014/0300709 A1* | 10/2014 | Futterer | G03H 1/2286 348/51 |
| 2014/0300839 A1* | 10/2014 | Choe | G02F 1/1313 349/15 |
| 2014/0327837 A1* | 11/2014 | Osterman | H04N 9/04 349/2 |
| 2015/0131036 A1* | 5/2015 | Yu | G02F 1/133528 349/96 |
| 2015/0153595 A1* | 6/2015 | Li | G02F 1/0045 349/62 |
| 2015/0178939 A1* | 6/2015 | Bradski | G02B 27/017 345/633 |
| 2015/0205126 A1* | 7/2015 | Schowengerdt | H04N 13/383 345/633 |
| 2015/0205182 A1* | 7/2015 | Leister | G02F 1/292 349/201 |
| 2015/0234190 A1* | 8/2015 | Schowengerdt | G02B 27/0172 345/156 |
| 2015/0234191 A1* | 8/2015 | Schowengerdt | G02B 27/0172 345/633 |
| 2015/0234205 A1* | 8/2015 | Schowengerdt | G02C 7/049 351/159.02 |
| 2015/0234254 A1* | 8/2015 | Schowengerdt | G02F 1/292 359/316 |
| 2015/0234476 A1* | 8/2015 | Schowengerdt | G06F 3/017 345/156 |
| 2015/0235418 A1* | 8/2015 | Schowengerdt | G06T 19/003 345/633 |
| 2015/0235419 A1* | 8/2015 | Schowengerdt | G06T 19/003 345/633 |
| 2015/0235421 A1* | 8/2015 | Schowengerdt | G06T 19/003 345/633 |
| 2015/0235431 A1* | 8/2015 | Schowengerdt | G06T 19/006 345/633 |
| 2015/0235436 A1* | 8/2015 | Schowengerdt | G06T 19/006 345/633 |
| 2015/0235437 A1* | 8/2015 | Schowengerdt | G06T 19/006 345/633 |
| 2015/0235438 A1* | 8/2015 | Schowengerdt | G06T 19/006 345/633 |
| 2015/0235439 A1* | 8/2015 | Schowengerdt | G06T 19/006 345/619 |
| 2015/0235440 A1* | 8/2015 | Schowengerdt | G06T 19/006 345/633 |
| 2015/0235442 A1* | 8/2015 | Schowengerdt | G06T 19/006 345/633 |
| 2015/0235443 A1* | 8/2015 | Schowengerdt | G06T 19/006 345/633 |
| 2015/0235444 A1* | 8/2015 | Schowengerdt | G06T 19/006 345/633 |
| 2015/0235445 A1* | 8/2015 | Schowengerdt | G06T 19/006 345/611 |
| 2015/0235446 A1* | 8/2015 | Schowengerdt | G06T 19/006 345/633 |
| 2015/0235448 A1* | 8/2015 | Schowengerdt | G06T 19/006 345/633 |
| 2015/0235454 A1* | 8/2015 | Schowengerdt | G06T 19/006 345/633 |
| 2015/0235458 A1* | 8/2015 | Schowengerdt | G06T 19/006 345/633 |
| 2015/0235459 A1* | 8/2015 | Schowengerdt | G06T 19/006 345/633 |

(56) References Cited

U.S. PATENT DOCUMENTS

| | | | |
|---|---|---|---|
| 2015/0235460 A1* | 8/2015 | Schowengerdt | G06T 19/006 345/633 |
| 2015/0235461 A1* | 8/2015 | Schowengerdt | G06T 19/006 345/156 |
| 2015/0235462 A1* | 8/2015 | Schowengerdt | G06T 19/006 345/633 |
| 2015/0235463 A1* | 8/2015 | Schowengerdt | G06T 19/006 345/633 |
| 2015/0235464 A1* | 8/2015 | Schowengerdt | G06T 19/006 345/633 |
| 2015/0235465 A1* | 8/2015 | Schowengerdt | G06T 19/006 345/633 |
| 2015/0235466 A1* | 8/2015 | Schowengerdt | G06T 19/006 345/633 |
| 2015/0235467 A1* | 8/2015 | Schowengerdt | G06T 19/006 345/633 |
| 2015/0235468 A1* | 8/2015 | Schowengerdt | G06T 19/006 345/633 |
| 2015/0235469 A1* | 8/2015 | Schowengerdt | G06T 19/006 345/633 |
| 2015/0235470 A1* | 8/2015 | Schowengerdt | G06T 19/006 345/633 |
| 2015/0235472 A1* | 8/2015 | Schowengerdt | G06T 19/006 345/633 |
| 2015/0235473 A1* | 8/2015 | Schowengerdt | G06T 19/006 345/633 |
| 2015/0260992 A1* | 9/2015 | Luttmann | G02B 27/0172 359/631 |
| 2015/0277116 A1* | 10/2015 | Richards | G02B 27/0103 359/13 |
| 2015/0309175 A1* | 10/2015 | Hinderling | G01S 7/4813 356/4.01 |
| 2015/0346536 A1* | 12/2015 | Wang | G02F 1/13362 349/68 |
| 2015/0363978 A1* | 12/2015 | Maimone | G02B 27/0172 345/633 |
| 2016/0062120 A1* | 3/2016 | Gupta | G02B 27/0101 359/630 |
| 2016/0081547 A1* | 3/2016 | Gramatikov | G06K 9/00604 351/210 |
| 2016/0091719 A1* | 3/2016 | Border | G02B 27/0172 359/630 |
| 2016/0104410 A1* | 4/2016 | Sagardoyburu | G09G 3/2003 345/4 |
| 2016/0109702 A1* | 4/2016 | Song | G02B 27/0101 359/486.01 |
| 2016/0131908 A1* | 5/2016 | Fateh | G02B 27/0172 345/633 |
| 2016/0131909 A1* | 5/2016 | Nakamura | G02B 27/0172 345/8 |
| 2016/0131911 A1* | 5/2016 | Border | G02B 27/0176 345/8 |
| 2016/0131912 A1* | 5/2016 | Border | G02B 27/0176 345/8 |
| 2016/0132082 A1* | 5/2016 | Border | G06F 1/26 345/211 |
| 2016/0133201 A1* | 5/2016 | Border | G09G 3/3413 345/694 |
| 2016/0139402 A1* | 5/2016 | Lapstun | G02B 6/34 349/193 |
| 2016/0148433 A1* | 5/2016 | Petrovskaya | G06T 19/006 345/633 |
| 2016/0154229 A1* | 6/2016 | Milner | G06T 7/80 348/79 |
| 2016/0154269 A1* | 6/2016 | Fukuoka | G02F 1/133536 345/690 |
| 2016/0182877 A1* | 6/2016 | DeLuca | H04N 13/0007 348/53 |
| 2016/0216556 A1* | 7/2016 | Du | G09G 3/003 |
| 2016/0253844 A1* | 9/2016 | Petrovskaya | G06Q 50/01 345/633 |
| 2016/0282639 A1* | 9/2016 | von und zu Liechtenstein | G02F 1/0136 |
| 2016/0320620 A1* | 11/2016 | Maimone | G06F 3/011 |
| 2016/0320625 A1* | 11/2016 | von und zu Liechtenstein | G02B 27/0179 |
| 2016/0339337 A1* | 11/2016 | Ellsworth | A63F 13/25 |
| 2016/0357014 A1* | 12/2016 | Beckman | B60J 3/02 |
| 2016/0357018 A1* | 12/2016 | Cakmakci | G02B 27/0172 |
| 2016/0359930 A1* | 12/2016 | Miller | H04L 67/38 |
| 2016/0377781 A1* | 12/2016 | Park | G02F 1/133536 349/194 |
| 2017/0059899 A1* | 3/2017 | Su | G02F 1/1323 |
| 2017/0059960 A1* | 3/2017 | Shi | G02F 1/13306 |
| 2017/0074796 A1* | 3/2017 | Hibara | G02F 1/13 |
| 2017/0123241 A1* | 5/2017 | Su | G02F 1/1323 |
| 2017/0171448 A1* | 6/2017 | Evans, V | H04N 5/2352 |
| 2017/0192263 A1* | 7/2017 | Jiang | G02F 1/1323 |
| 2017/0195653 A1* | 7/2017 | Trail | H04N 13/0253 |
| 2017/0205892 A1* | 7/2017 | Petrovskaya | G06T 17/20 |
| 2017/0214907 A1* | 7/2017 | Lapstun | H04N 13/0438 |
| 2017/0227770 A1* | 8/2017 | Carollo | G02B 27/0172 |
| 2017/0227791 A1* | 8/2017 | von und zu Liechtenstein | G02F 1/01 |
| 2017/0269274 A1* | 9/2017 | Cheng | G02B 1/14 |
| 2017/0293143 A1* | 10/2017 | Martinez | G02B 27/01 |
| 2017/0299869 A1* | 10/2017 | Urey | A61B 3/032 |
| 2017/0299870 A1* | 10/2017 | Urey | G02B 27/0172 |
| 2017/0307939 A1* | 10/2017 | Banin | G02F 1/133617 |
| 2017/0336641 A1* | 11/2017 | von und zu Liechtenstein | G06T 19/006 |
| 2017/0373459 A1* | 12/2017 | Weng | H01S 3/08009 |
| 2018/0045871 A1* | 2/2018 | Choi | G02B 5/30 |
| 2018/0143508 A1* | 5/2018 | Uetsuka | G02F 1/31 |
| 2018/0149584 A1* | 5/2018 | Scarlett | G01N 21/19 |
| 2018/0164882 A1* | 6/2018 | Johnson | G06F 3/013 |
| 2018/0190011 A1* | 7/2018 | Platt | G02B 27/017 |
| 2018/0275471 A1* | 9/2018 | Park | G02F 1/1368 |
| 2018/0278921 A1* | 9/2018 | Woods | H04N 13/117 |
| 2018/0290479 A1* | 10/2018 | Geday | G07D 7/00 |
| 2018/0314109 A1* | 11/2018 | Sakai | |

OTHER PUBLICATIONS

Kiyokawa, et al., "An Optical see-Through Display for Mutual Occlusion with a Real-Time Stereovision System", In Proceedings of Computers and Graphics, vol. 25, Issue 5, Oct. 2001, 15 pages.

Gao, et al., "Occlusion Capable Optical See-through Head-Mounted Display Using Freeform Optics", In Proceedings of IEEE International Symposium on Mixed and Augmented Reality, Nov. 5, 2012, 2 pages.

ISA European Patent Office, International Search Report and Written Opinion Issued in Application No. PCT/US2016/016035, dated May 11, 2016, WIPO, 11 Pages. (355735.02).

IPEA European Patent Office, Second Written Opinion Issued in PCT Application No. PCT/US2016/016035, Feb. 3, 2017, WIPO, 7 Pages. (355735-WO-PCT).

IPEA European Patent Office, International Preliminary Report on Patentability Issued in PCT Application No. PCT/US2016/016035, dated May 24, 2017, WIPO, 8 Pages.

* cited by examiner

SELECTIVE OCCLUSION SYSTEM FOR AUGMENTED REALITY DEVICES

BACKGROUND

Augmented reality systems may display generated images via a see-through display device to allow a user to view virtual objects over a real-world background.

SUMMARY

Examples are disclosed that relate to selectively occluding background light to facilitate viewing of virtual objects displayed on a near-eye display. One example provides a near-eye display system comprising a see-through display, an image source configured to produce images for display on the see-through display, a background light sensor configured to sense a brightness of a real-world background, a selective background occluder comprising a first liquid crystal panel and a second liquid crystal panel spaced from the first liquid crystal panel, the first liquid crystal panel and the second liquid crystal panel being positioned between a common pair of polarizers, and a computing device comprising a logic subsystem and a storage subsystem storing instructions executable by the logic subsystem to determine a shape and a position of an occlusion area based upon a virtual object to be displayed on the see-through display, obtain a first birefringence pattern for the first liquid crystal panel and a second birefringence pattern for the second liquid crystal panel based upon the shape and the position of the occlusion area, produce the occlusion area by applying the first birefringence pattern to the first liquid crystal panel and the second birefringence pattern to the second liquid crystal pattern, and display the virtual object in a location visually overlapping with the occlusion area.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, augmented reality (AR) displays such as near-eye displays may allow the simultaneous viewing of displayed virtual objects and a real-world background. Such AR displays may superimpose generated images over, and thereby add light to, the view of the real-world background. However, various ambient light conditions may reduce a contrast of displayed virtual objects, which may make displayed images difficult to see over the background.

As such, it may be desirable to selectively dim or block light from the real-world view, such as from bright areas (e.g. a sun-lit patch of snow) that appear behind a displayed virtual object. However, selectively dimming or blocking light from parts of the real-world background may pose challenges. For example, near-eye displays may form images on a see-through display via projection or via an embedded emissive display technology, and as such the displayed images add additional light to the scene viewed by a user. Because such technologies are additive, dimming or blocking light from the real-world background using such technologies may be difficult. Some solutions may involve globally dimming the entire view of the real-world background, for example, by applying a neutral density filter on the see-through display to attenuate the intensity of light viewed, or by using electrochromic materials to electronically control light transmission. However, some such methods may not allow for selectively dimming or blocking selected areas of the real-world view while not dimming or blocking others.

Figure 1A:
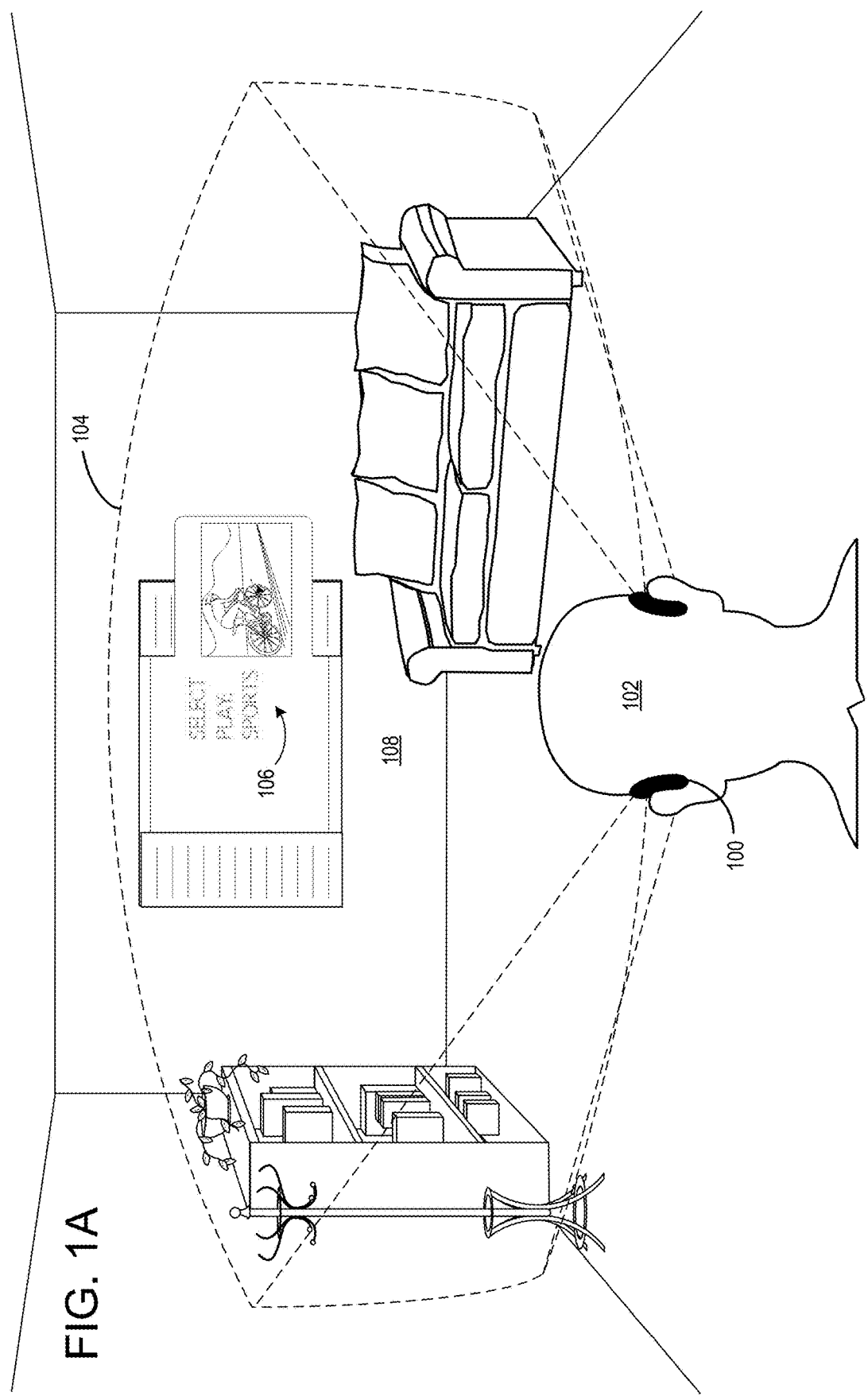
FIG. 1A shows an example near-eye display displaying an augmented reality view without selective occlusion.
Figure 1B:
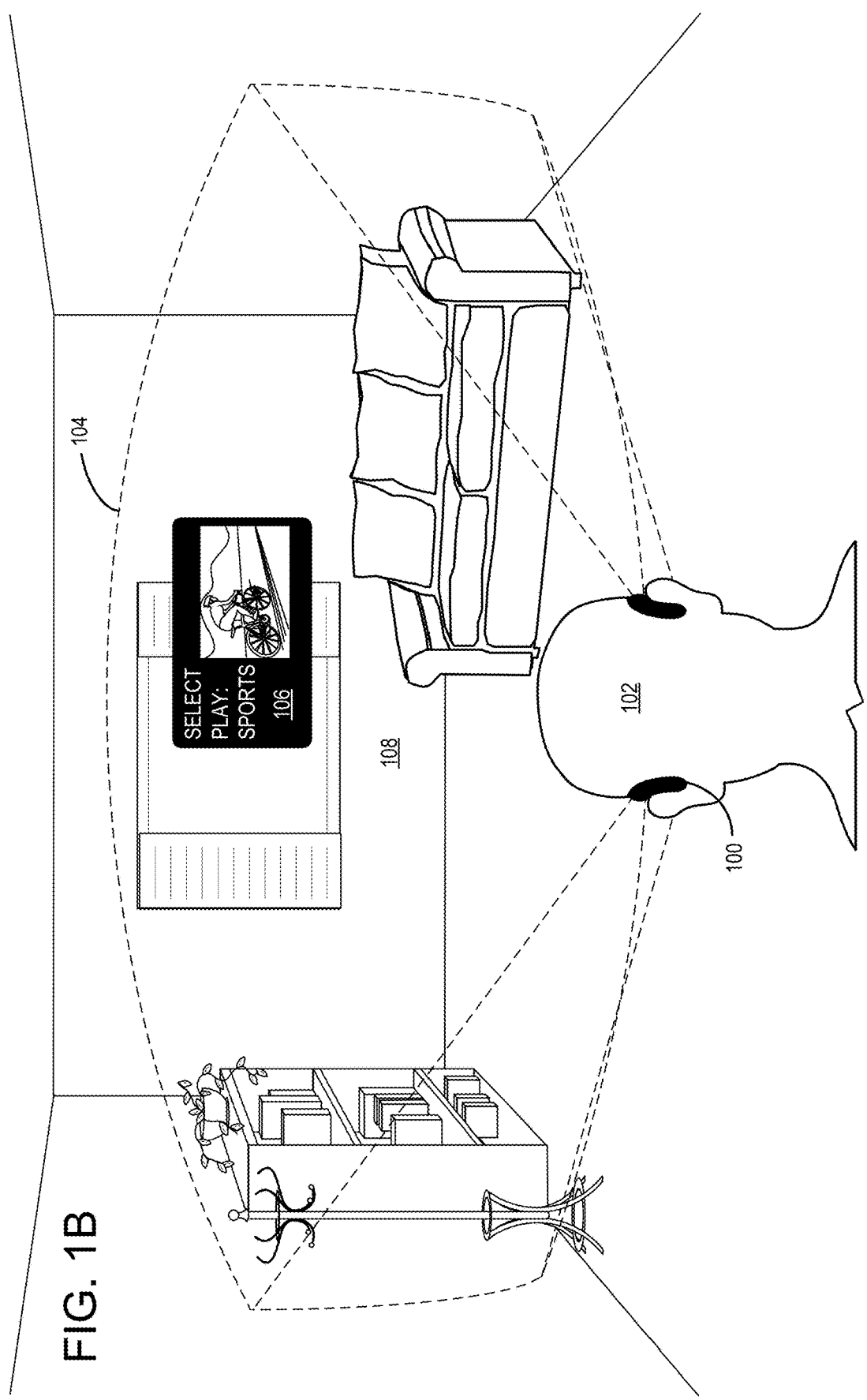
FIG. 1B shows an example near-eye display displaying an augmented reality view with selective occlusion.

Accordingly, examples disclosed herein are directed to reducing background light passing through selected areas of see-through display via a selective occluder. The disclosed examples may help to maintain suitable image fidelity and contrast of augmented reality images, even in bright ambient light conditions. FIGS. 1A and 1B show an example use environment for an example near-eye display system 100 being worn by a user 102 viewing an augmented reality view 104, and illustrate the use of a selective occluder to increase an image contrast. Augmented reality view 104 comprises a virtual object 106 displayed in front of a real-world background 108. In FIG. 1A, augmented reality view 104 is displayed without selective occlusion. As such the virtual object 106 including text overlaid on the bright area of the window appears washed out or otherwise difficult to see due to low contrast. As a result, it may be difficult to discriminate virtual object 106 from the real-world background 108. In FIG. 1B, augmented reality view 104 is displayed with selective occlusion, where light from the area of real-world background 108 behind virtual object 106 is at least partially blocked, resulting in more clearly visible text. It will be understood that the near-eye display system 100 may be used in virtually any environment, indoors or outdoors.

Figure 2:
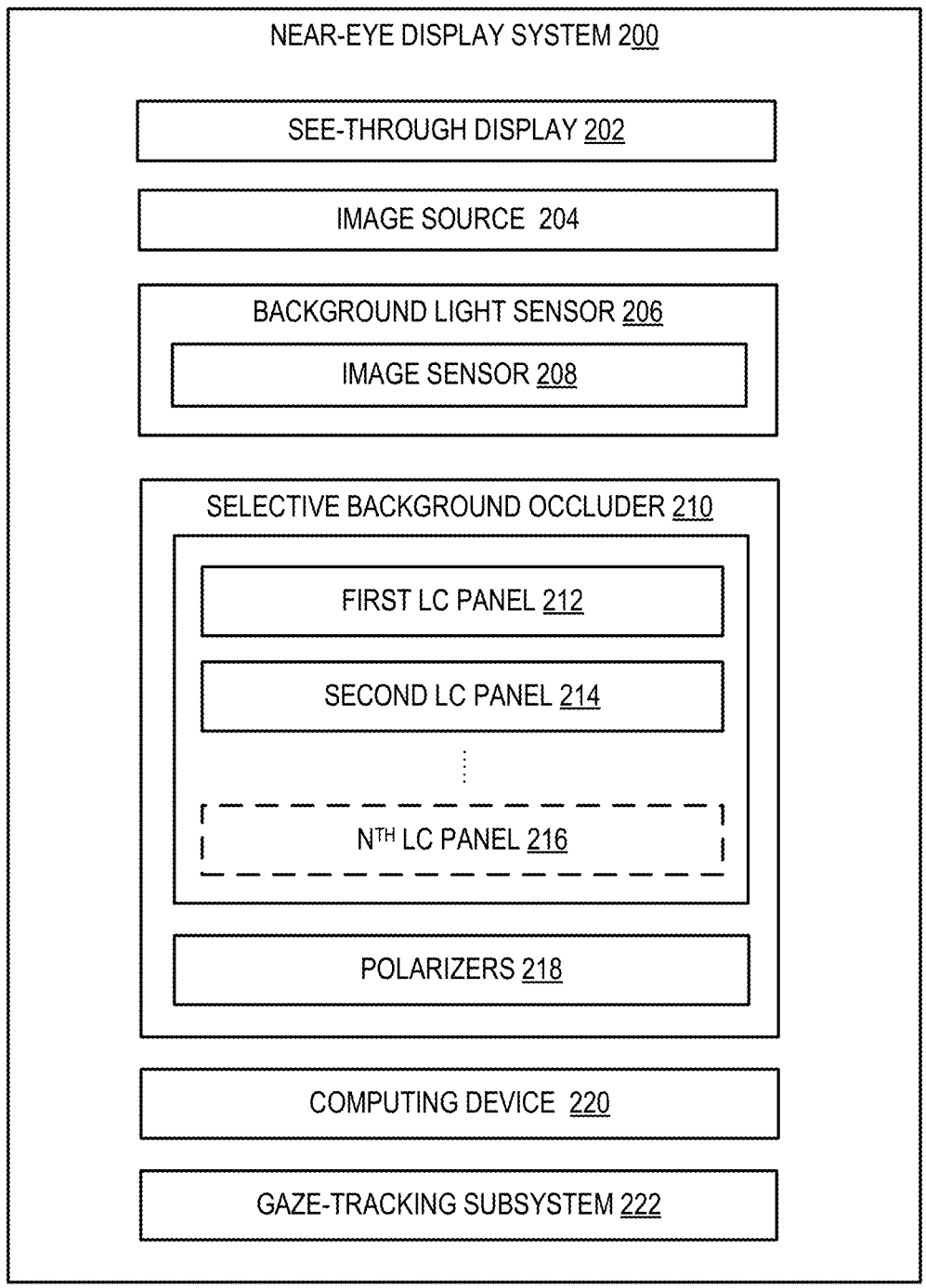
FIG. 2 shows a block diagram of an example near-eye display system.

Near-eye display system 100 may have any suitable physical form. In some examples, near-eye display system 100 may take the form of a pair of eyeglasses as shown in FIGS. 1A and 1B. In other examples, near-eye display system 100 may take the form of a helmet, goggles, veil, etc.

in which a see-through display system is supported in front of a user's eye(s). FIG. 2 shows a block diagram of an example near-eye display system 200 comprising a see-through display 202 and an image source 204 configured to produce images for display on see-through display 202. Image source 204 may comprise any suitable image producing device. For example, in some implementations, image source 204 may include one or more spatial light modulators, such as one or more LCOS (liquid crystal on silicon) microdisplays, along with a suitable light source to provide light to the spatial light modulator. In other implementations, image source 204 may include an emissive light source, such as an OLED (organic light emitting device) microdisplay. Images from such image sources may be delivered to the see-through display 202 via any suitable mechanism, including but not limited to waveguide-based and/or prism-based optical arrangements.

Near-eye display system 200 may further comprise a background light sensor 206 configured to sense a brightness of the real-world background. Background light intensity data from such a sensor may be used as input to operation of a selective background occluder 210 for selectively reducing light from the real-world background based upon the brightness. In some implementations, an outward-facing image sensor 208 may be used as a background light sensor. In such implementations, images may be acquired of a background scene, and then analyzed for any locations at which a light intensity may make viewing of any displayed virtual objects difficult. This may allow selective occlusion to be applied in such areas, and not applied in other areas, even where occluded and unoccluded areas may lie behind a same displayed virtual object. In other examples, a photodiode or other light intensity sensor may be used to measure a background light intensity globally, and areas behind all displayed virtual objects may be selectively occluded when the background light intensity is sufficiently high.

Near-eye display system 200 further comprises a computing device 220 comprising a logic subsystem and a storage subsystem comprising instructions executable by the logic subsystem to operate the selective occluder 210 and the near-eye display system 200, among other functions. Example implementations of computing device 220 are described in more detail below.

Near-eye display system 200 may further comprise a gaze-tracking subsystem 222 to track a gaze position of the user's eye. Gaze location information may serve as further input to operation of selective background occluder 210. Any suitable gaze tracking technology may be utilized. As one non-limiting example, the gaze-tracking subsystem may include one or more inward-facing cameras (e.g. positioned to capture an image of a user's eye), and one or more light sources configured to direct light (infrared or visible) toward a user's eye. Gaze direction may be determined based upon the location of a pupil of an eye and reflections from the light sources in images from the inward facing camera. Other gaze tracking implementations may omit such light sources. It will be understood that the components shown in FIG. 2 are shown for the purpose of example and are not intended to be limiting in any manner, as any other suitable components may be utilized.

Figure 3:
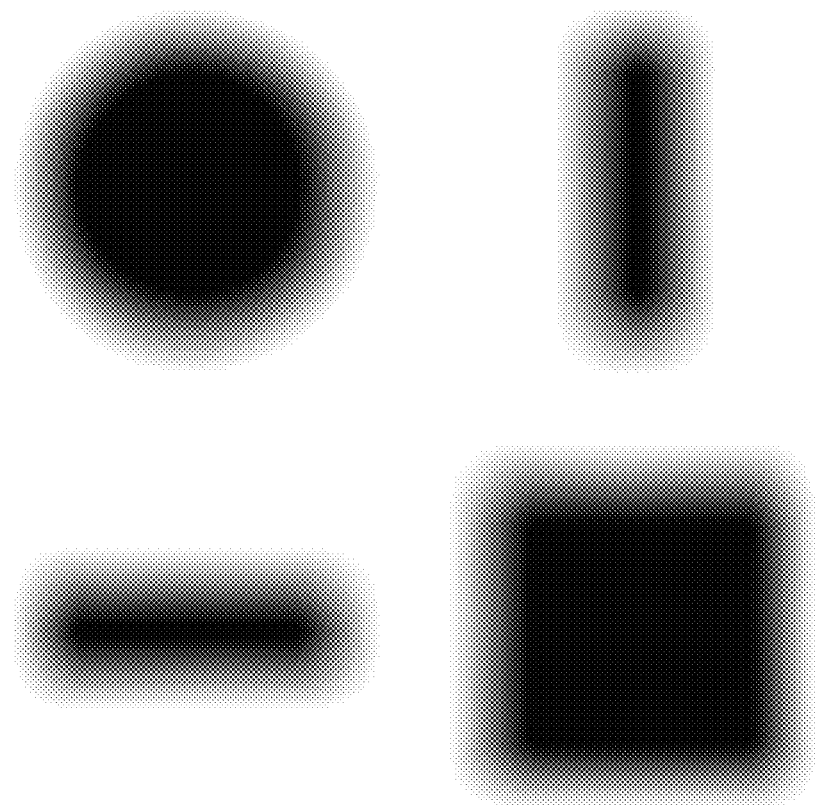
FIG. 3 shows an example view of various example occlusion shapes as viewed through a single-panel selective occluder.

Implementing a selective background occluder in a near-eye display system may pose various challenges. For example, the use of a selective background occluder on a mobile device may pose limitations on size and weight of the occluder. Further, in the case of a near-eye display, such as a head-mounted display, the close proximity of the occluder to the eye may pose additional challenges. For example, one possible occluder may utilize a single LCD (liquid crystal display) panel placed between a see-through display and a real world background from a user's perspective, such that the LCD panel may be controlled to form occlusion areas behind displayed virtual images. However, the use of such an occluder placed near the eye may result in blurring and/or distortions near the edges of displayed occlusion shapes. FIG. 3 shows a representation of perceived images of four sharply formed occlusion shapes (a circle and three rectangles) that are placed 20 millimeters (mm) in front of an eye, as viewed through a single-panel occluder. In this example, the angular extent of the image is 60 degrees per side and the eye pupil diameter is assumed to be 3 mm. It is also assumed that the eye is focused at infinity. The blur as shown in FIG. 3 extends over the edge occlusion shapes in an angular range of about 5 degrees. The blur may arise, for example from the edge of the occluder partially blocking the entrance aperture of the eye. Distortions are also visible near the edges of the occlusion shapes. Such distortions may arise, for example, from the eye's optical system amplifying the effect of its asymmetric aperture.

Thus, the examples disclosed herein utilize two or more liquid crystal (LC) panels positioned between a common pair of polarizers to form occlusion areas. As described in more detail below, the creation of occlusion areas via plural liquid crystal panels spaced apart and positioned between a common pair of polarizers may result in sharper transition regions at the edges of the occlusion shapes, and thus may provide for a more realistic augmented reality presentation than where the occlusion shapes are more blurred at the edges, than the use of a single liquid crystal panel. Returning to FIG. 2, selective background occluder 210 is illustrated as comprising a first LC panel 212 and a second LC panel 214 spaced from first LC panel 212. First LC panel 212 and second LC panel 214 are positioned between a common pair of polarizers 218. While the disclosed examples are described in the context of two LC panels positioned between a common pair of polarizers, a selective background occluder 210 may further comprise additional LC panels, as shown in FIG. 2 by Nth liquid crystal panel 216, between the common pair of polarizers.

Figure 4:
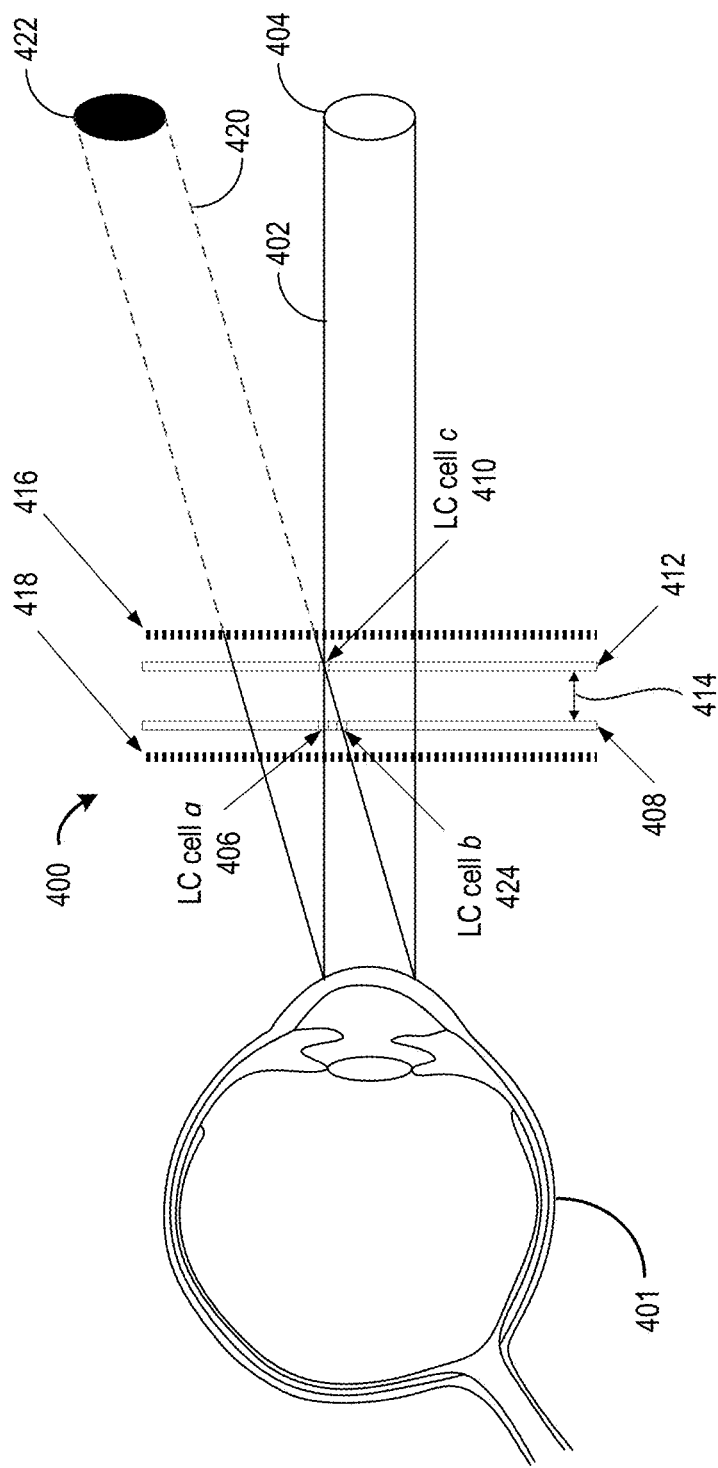
FIG. 4 shows an example implementation of a two-panel selective occluder.

Selective background occluder 210 may have any suitable configuration. FIG. 4 shows a schematic diagram of one example implementation of selective background occluder 400, and illustrates a user's eye 401 relative to light rays that traverse selective background occluder 400. The upper horizontal light ray 402 from white target area 404 traverses LC (liquid crystal) cell a, 406 of first LC panel 408 and LC cell c, 410 of second LC panel 412. First LC panel 408 and second LC panel 412 are spaced from each other by a gap 414 of a suitable optically transparent material. In various implementations, the gap 414 may take the form of an air-gap, or an optically transparent solid material (e.g. polymethyl(methacrylate) (PMMA)), which may also provide mechanical support for the structure. First LC panel 408 and second LC panel 412 are positioned between a common pair of polarizers comprising polarizer 416 and polarizer 418.

The combined birefringence of the LC cell a and LC cell c may be configured to cause little to no attenuation of the upper horizontal light ray 402 in addition to the intrinsic light loss caused by the pair of polarizers. Malus's law governing the transmission of light through an ideal polarizer defines light intensity as a function of the rotation angle in this example as $\theta=a+c$, wherein a is the rotation from LC cell a and c is the rotation from LC cell c. Applying Malus's law here, the transmitted light intensity may be represented as $I=I_0 \cos^2(\theta)$. As such, the combined birefringence of LC cell a and LC cell c may be configured such that $\cos^2(a+c)=1$, such that upper horizontal light ray 402 is transmitted. In this case, the plane of polarization may be assumed to be the same for both polarizers, though the polarization planes may also be arranged at 90 degrees to one another. The use of parallel polarization planes may provide for a default mode where the selective occluder is transparent when no voltage is applied to the liquid crystal panels, whereas the use of a 90 degree offset may involve application of a voltage to form a transparent pixel.

Continuing with FIG. 4, the bottom ray 420 of the occluded target area 422 traverses LC cell c 410 of second LC panel 412 and LC cell b 424 of first LC panel 408 before reaching user's eye 401. In this case, bottom ray 420 may be blocked in that the combined birefringence of LC cell b and LC cell c may be configured such that $\cos^2(b+c)=0$.

As the pixel size of the LC panels may be much smaller than the pupil diameter of the eye 401, there may be a large number of pixels that affect the light reaching one particular photoreceptor on the retina of the eye. Further, each photoreceptor on the retina creates its own set of rays, each ray imposing constraints on the birefringence patterns of the LC panels. Thus, the birefringence patterns for the LC panels may be over-constrained, in that there are many more rays that there are cells in each LC panel. Consequently, it may be difficult to find solutions that achieve the effect of blocking light from certain directions while passing all other light. However, as described in more detail below, the inventors herein have identified such solutions.

Figure 5:
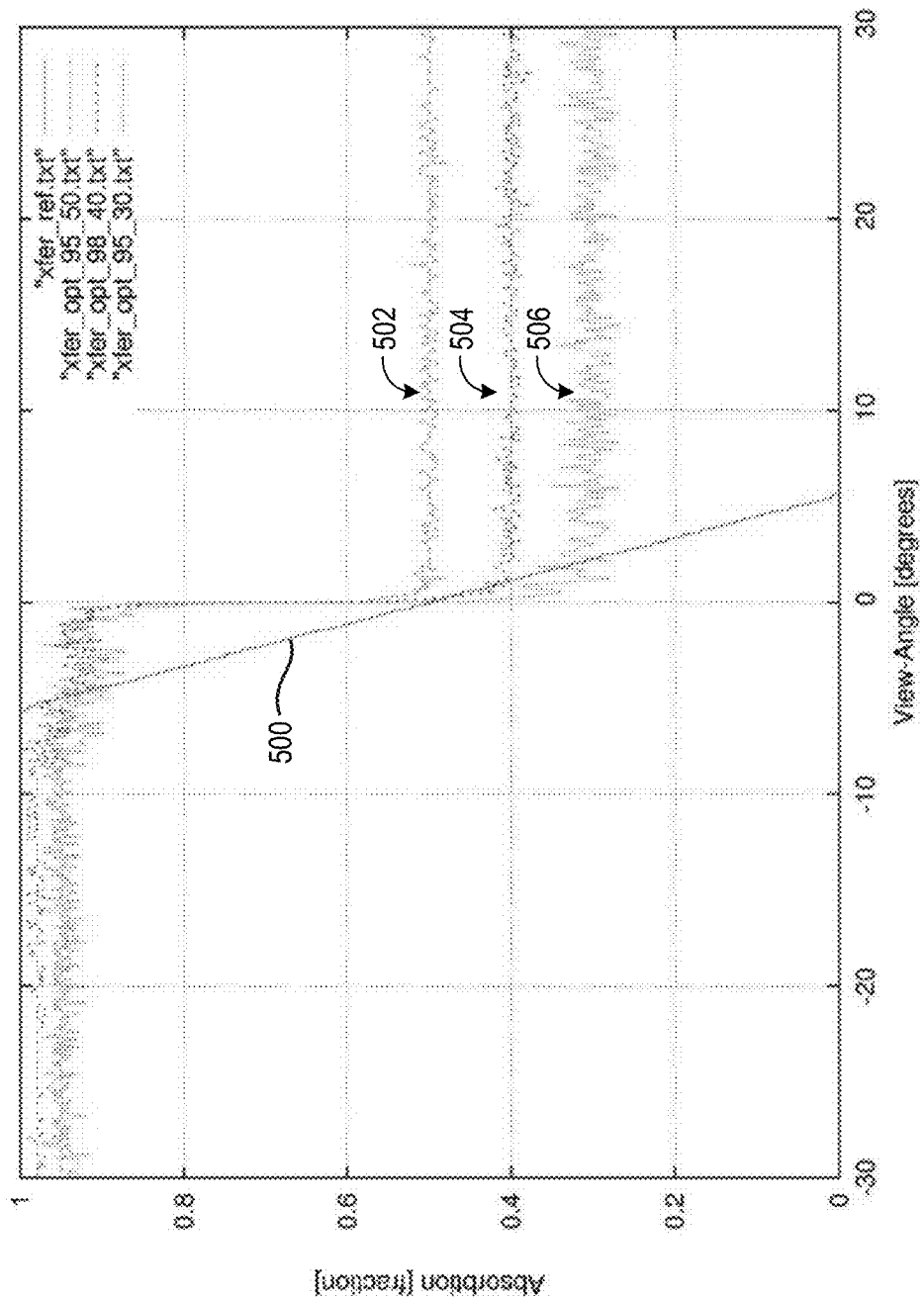
FIG. 5 shows a graph of results from a simulation of one-dimensional occlusion patterns.

FIG. 5 shows a graph illustrating results of simulations of a one-dimensional occlusion using an example selective occluder as disclosed herein. In this example it is assumed that light from viewing angles less than zero degrees is occluded while light from viewing angles greater than or equal to zero pass through. The continuous line 500 illustrates the effect of a sharp edge centered on the optical axis, where the sharp edge yields a blurred, angle-dependent attenuation function that varies over an angular range from about −6 to +6 degrees. In contrast, the results of using two LC panels with a gap of 2 mm that are positioned 20 mm away from the eye are represented by the three dotted lines 502, 504, and 506. It may be noted that a much sharper transition is obtained. The birefringence pattern was configured to achieve 95-95% absorption, rather than 100% absorption, as a more relaxed target function may be less constraining on the solution and thus causes fewer artifacts near the transition. Artifacts, referring to the appearance of unwanted structures in the perceived image, may be similar to the phenomena of fixed-pattern noise in imaging devices where variation in the sensitivity of individual pixels due to fabrication tolerances may cause a modulation of the image that is stationary. However, unlike the fixed pattern noise in a camera chip, compensation for the selective background occluder may be more complex. The fixed pattern noise of the occlusion shape may be seen by the variation of the dotted lines in FIG. 5. On the right side of the graph, the three sample solutions were selected to achieve 30%, 40%, and 50% transmission. Thus, the use of a two-panel selective background occluder may involve a trade-off between noise and the transparency of the unoccluded view, where more transparency may result in more noise.

The results of FIG. 5 were obtained via simulated annealing, where the object function was the sum of the square differences between the actual occlusion and the desired occlusion. As discussed in more detail below, the use of simulated annealing may be relatively inefficient in computing birefringence patterns for a given occlusion function. However, the result of FIG. 5 demonstrates one example solution, as well as the characteristics of the solution. Examples of methods of determining birefringence patterns to apply to the LC panels of a selective occluder that may be more efficient than simulated annealing are described in more detail below.

Figure 6:
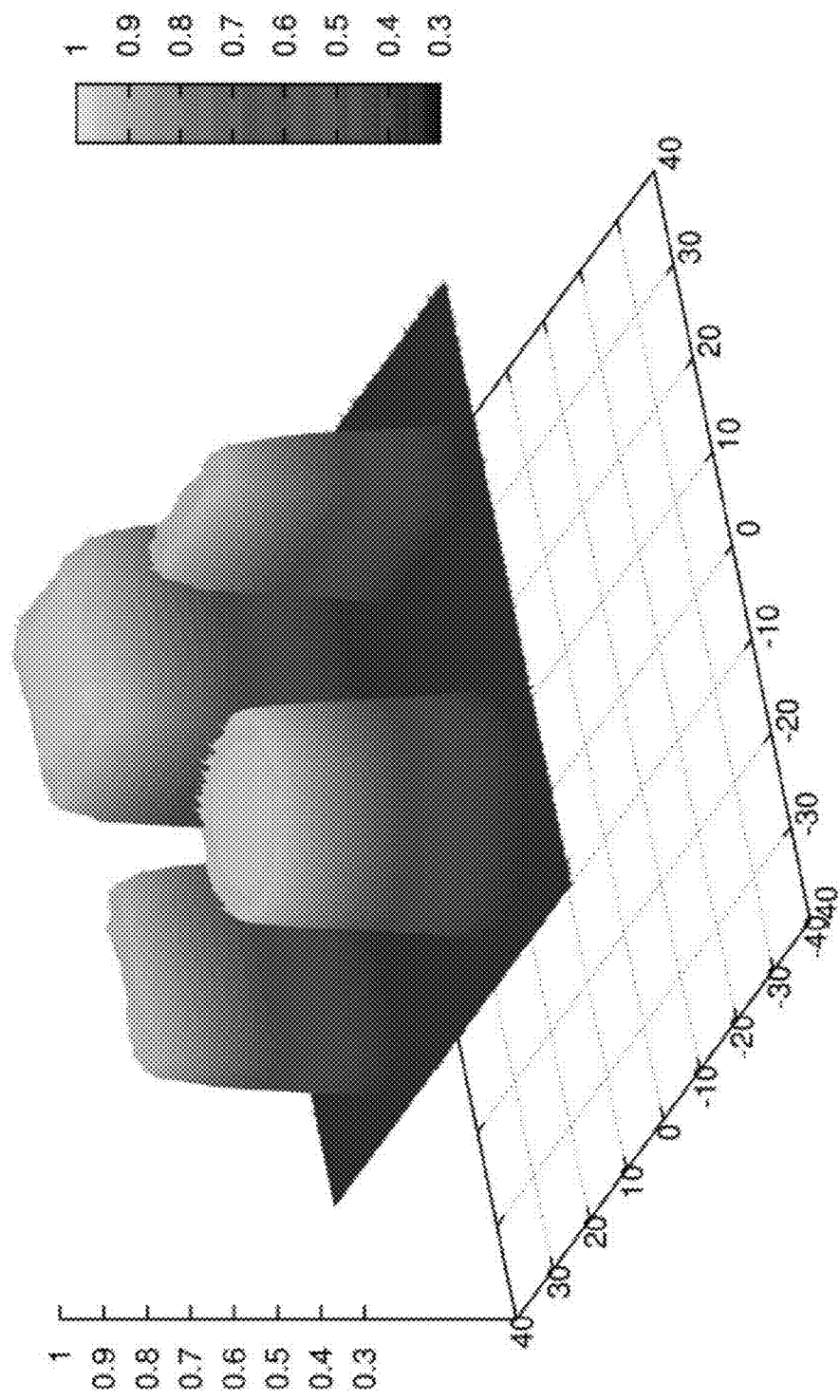
FIG. 6 shows a graph of results from a simulation of two-dimensional occlusion patterns.
Figure 7:
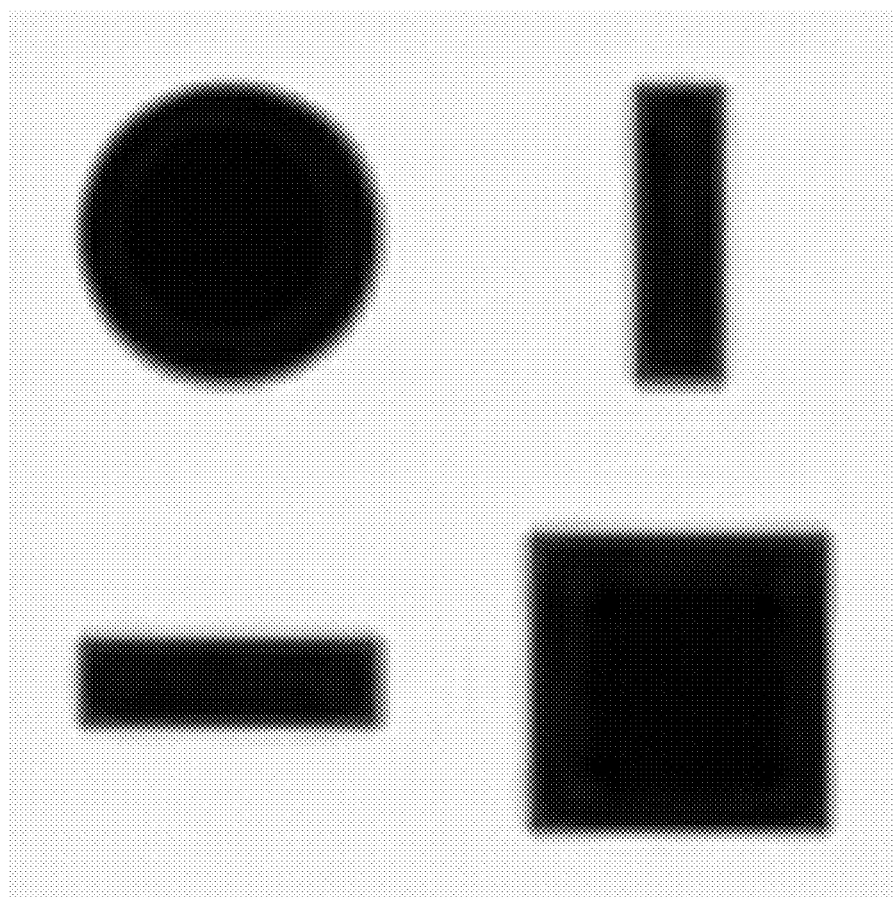
FIG. 7 shows an example view of the occlusion shapes as produced by a two-panel selective occluder.

FIG. 6 shows the results of birefringence patterns computed for two-dimensional occlusion patterns, also using geometrical ray tracing and simulated annealing. FIG. 7 shows the occlusion shapes as produced by the occlusion patterns of FIG. 6 as perceived on a uniformly white background via the use of a two-panel selective occluder as disclosed herein. The occlusion shapes cover a 64-degree (+/−32 degrees with respect to the optical axis) field of view in both horizontal and vertical directions. Three rectangular and one circular areas are occluded using two LC panels positioned 20 and 22 mm in front of the eye. The LC panels use square pixels with 30 micrometer pitch. The pupil diameter is assumed to be 3 mm. With the eye focused at infinity, about 7800 LC pixels cover the pupil, and thus each view point (photoreceptor on the retina) receives an averaged light from about 7800 distinct light rays. In this example, light rays are modeled as rectangular prisms defined by the LC panels' square pixel geometry. The rays are subdivided into four partial rays with appropriate weight, because the cells of the second LC panel may not line up with the cells of the first LC panel given the position and direction of the ray.

Figure 8:
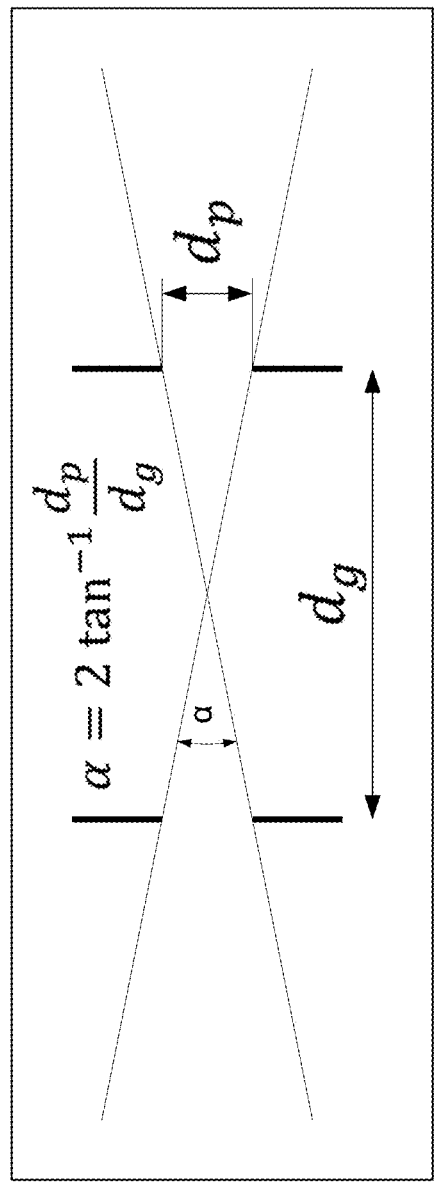
FIG. 8 shows an angular range of rays that traverse a pair of pixels in two liquid crystal panels of an example selective occluder.

The results of the two-dimensional simulation of FIG. 6 show that solutions for the two-dimensional case exist. Further, the trade-off between noise and transparency may be less noticeable than in the one-dimensional case. The achieved sharpness of the occluder edge approximately matches the expectation that can be derived from the occluder geometry. For example, FIG. 8 illustrates the angular range of light rays that traverse a pair of pixels in the two LC panels, wherein the angular range is represented by the light cone angle, $\alpha$, that is expected from two holes with diameter $d_p$ of one pixel each that are separated by the inter-panel gap $d_g$. For 30-micrometer holes separated by 2 mm, the angle $\alpha$ is approximately 1.7 degrees, which is close to the observed angular transition from 10% to 90% transmission of 1.5 degrees. This relation also shows that the inter-panel gap may be increased, or the pixel size of the LC panels may be reduced, to possibly obtain sharper edges. However, reducing the pixel size may increase costs, as it increases the total number of pixels per LC panel. Further, as pixel size decreases, it is possible that diffraction effects may limit the resolution and give rise to complex artifacts, which may increase the complexity of computing the LC panel birefringence patterns.

As mentioned above, in some implementations a selective occluder as disclosed herein may utilize more than two LC panels located between a common pair of polarizers. Adding a third LC panel, or more additional panels, may improve transmission and/or reduce fixed-pattern-like artifacts. Further, adding additional LC panels may allow the substitution of one high resolution panel with two lower resolution panels to achieve similar results as the use of a higher resolution panel.

As the birefringence patterns applied to the LC panels to form an occlusion shape may not be unique, in some implementations multiple different solutions may be used in rapid succession to help reduce fixed-pattern noise artifacts via averaging. Because a near-eye display may require that the occlusion pattern appear stationary with respect to the outside view, this dithering over multiple solutions may be combined with the computation of the patterns due to head motion.

Figure 9A:
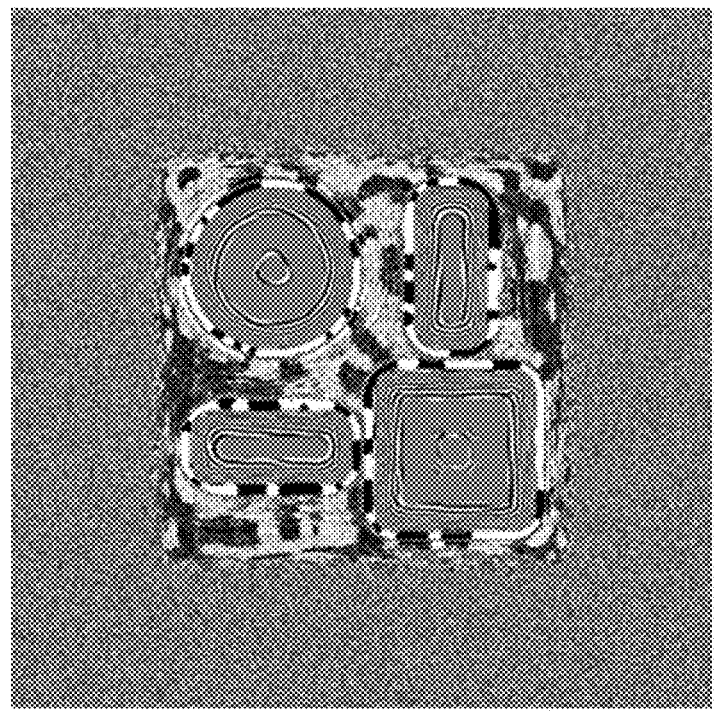
FIGS. 9A and 9B show example birefringence patterns produced on two liquid crystal panels of an example selective occluder to form the occlusion shapes of FIG. 7.
Figure 9B:
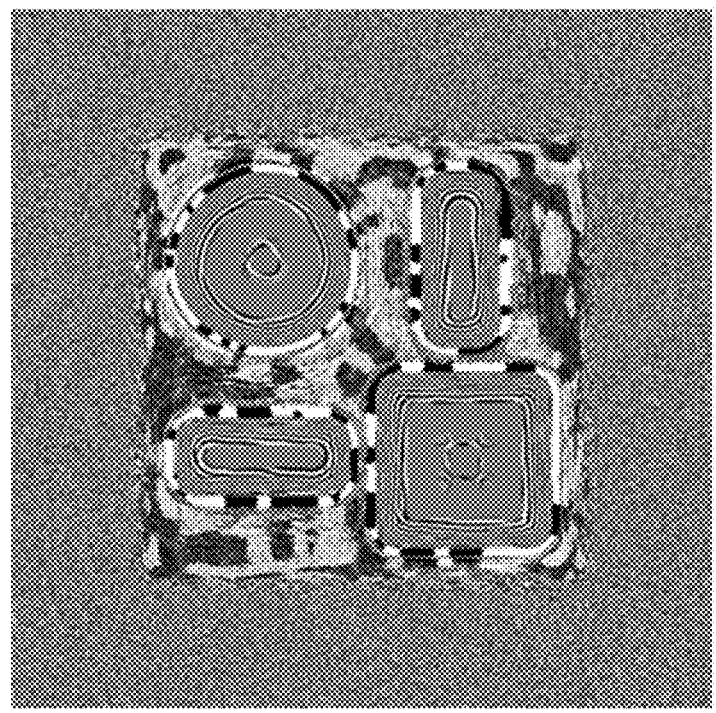

FIGS. 9A and 9B show example birefringence patterns that may be produced on the first LC panel and second LC panel, respectively, to produce the occlusion shapes of FIG. 7. The birefringences of the array of pixels on each LC panel were initialized with random numbers. Thus, FIGS. 9A and 9B show noise at the margins of each array. In this example, only the parts of the array that contributed to a visible image point were subjected to the simulated annealing procedure to produce the occlusion pattern. Further, the limited pupil diameters used in this example may cause the patterns that contribute to an occluder edge to be truncated. It may be noted that the birefringence patterns may include some amounts of error. For example, the pattern for the circular occlusion shape may ideally have circular symmetry, while in FIGS. 9A and 9B the circular pattern is imperfect. This finger-print like appearance may be partially due to the distributed pattern formation process, and partially due to the target function having staircased (e.g. non-aliased) edges due to quantization to a pixelated grid. As a result, the circular patterns in FIGS. 9A and 9B are not perfectly round.

Computing the birefringence patterns for the LC panels from the shape and position of a desired occlusion area via simulated annealing may be impractically slow. For example, the result shown in FIG. 9 took approximately one week to compute on a high-end server using twenty central processing units and 44 gigabytes of memory. Accordingly, in some implementations, the birefringence patterns for a virtual object may be obtained from pre-computed patterns, e.g. via a look-up table, to achieve results faster. Such a determination of birefringence patterns may be based on the concept that the birefringence along a line perpendicular to an edge between occluded and transparent areas is similar to a linear FM chirp. The result of the determination is similar to the autocorrelation function of the linear FM chirp used in radar processing, except that a sharp edge is produced rather than a narrow pulse. Thus, an occluder construction determination may start by determining the outline of the occluded area and computing line segments that are perpendicular to the outline. The birefringence values along these line segments may then be obtained from a lookup table. Such an approach may produce convex, smooth occlusion areas, such as circles and ellipses. Further, sharp edges, such as corners of rectangles or other polygons, may have more complex patterns, and as such may be pre-computed and stored. A lookup table for assembling a birefringence pattern thus may include library of edge patterns, including e.g. corners, arcs, and linear segments. Further, as the occlusion process preserves translation and rotation, moving the occlusion shape to a different angular position may be accomplished by moving the birefringence patterns linearly. Likewise, to rotate an occlusion shape, the birefringence pattern may be rotated accordingly. It will be noted that assembling a birefringence pattern from pre-computed patterns may be a much more efficient process than computing birefringence pattern for an occlusion area on an area-by-area basis, and thus may be practical for providing a set of occlusion shapes for a near-eye display.

In various implementations, the LC panels may or may not utilize color filters. LC panels not utilizing color filters may have a larger fill factor of the LC panels (e.g. the percentage of the pixel area that is filled with emitted light) relative to those that utilize color filters. Further, the use of passive matrix LC panels also may help to increase the fill factor in comparison to active matrix panels. Passive matrix LC panels also may be less costly than active matrix LC panels. However, the multiplexing ratio of passive matrix displays may limit the image fidelity of LC panels with a large number of pixels.

The use of LC panels with a relatively higher fill factor may help to avoid scattering of light coming from the real-world background caused by the electrical structures in an active matrix LC panel. As one non-limiting example, passive matrix LC panels may comprise narrow gaps between indium-tin-oxide electrodes. As another non-limiting example, such passive matrix LC panels may comprise gaps filled with an index-matched, transparent insulating material. LC cells in a passive matrix configuration may cause ghosting, halo effects, and/or other image effects. However, use of the precomputed birefringence patterns as described above may help to address such artifacts.

Due to the wavelength dependence of birefringence, it may be possible that the occlusion area may appear in a color other than dark gray or black. However, such a color effect may only be noticeable where a bright outside light source is being occluded. Further, a virtual image or object generated by the near-eye display system may be unaffected by this effect.

An appearance of the occlusion area as produced by the near-eye display system may be adjusted further by controlling a focus distance of the occlusion area. The focus distance of the occlusion area may be controlled, for example, by appropriate scaling of the birefringence pattern for the second LC panel. Computation of the birefringence pattern to account for the focus distance may utilize depth information (e.g. as obtained from a depth camera incorporated into the near-eye display device) in addition to the geometrical shape of the occlusion area. Further, in some implementations, a birefringence pattern may account for the gaze position of the user's eye as obtained by a gaze-tracking subsystem as disclosed herein so that the occlusion area may appear stereoscopically correct.

Figure 10:
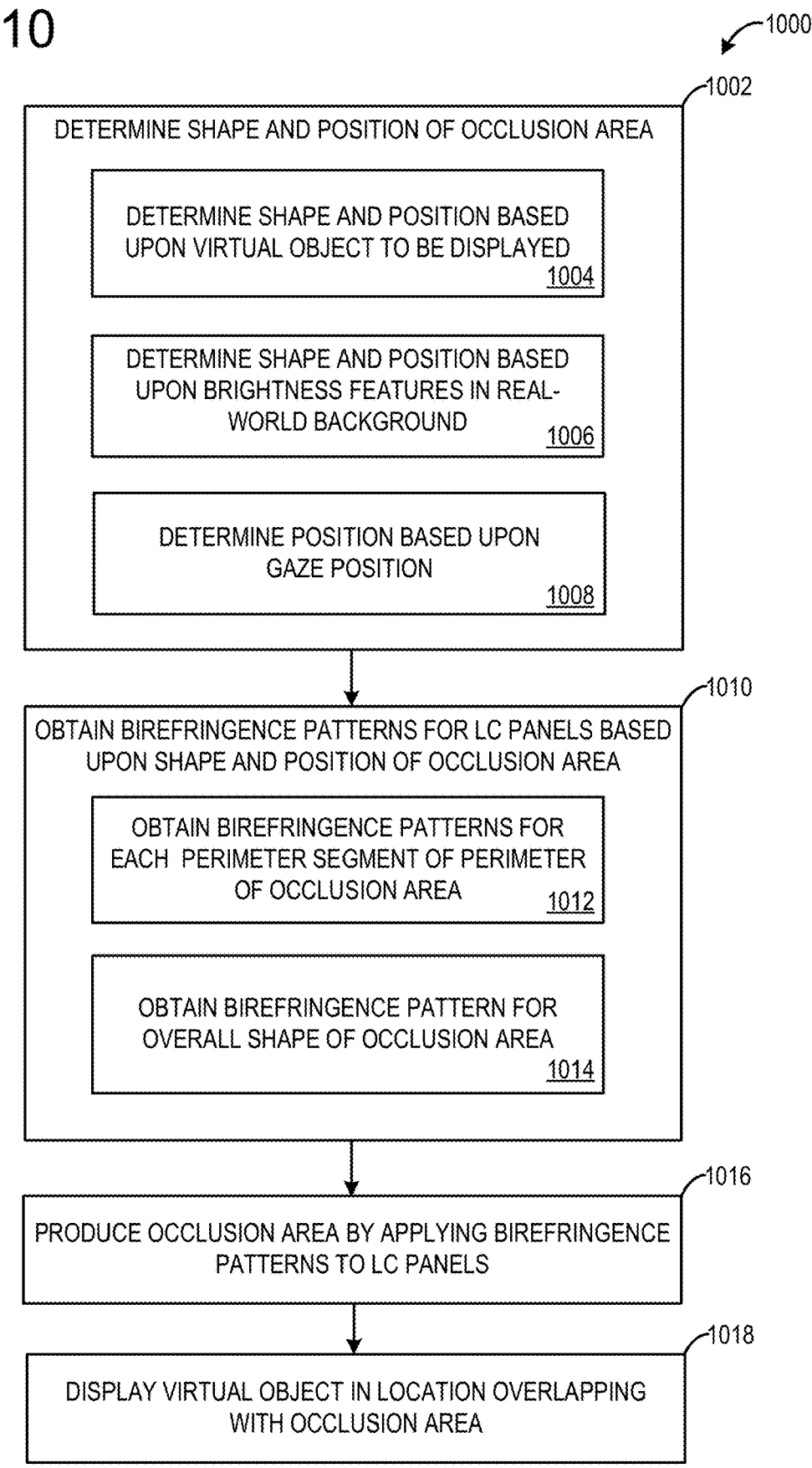
FIG. 10 shows a flow diagram of an example method for operating a selective occluder.

FIG. 10 shows an example method 1000 for operating a selective occluder on a near-eye display as disclosed herein. Method 1000 comprises, at 1002, determining a shape and position of the occlusion area. The determined shape and position of the occlusion area may be based upon various factors. Non-limiting examples include a shape and/or position of the virtual object to be displayed on the see-through display, as shown at 1004, one or more brightness features in the real-world background (e.g. locations of areas of high brightness, such as windows, reflections from glass, etc.), as shown at 1006, and/or a gaze position of the user's eye, as shown at 1008. Next, method 1000 comprises, at 1010, obtaining birefringence patterns for the LC panels based upon the shape and the position of the occlusion area. Obtaining birefringence patterns may comprise, at 1012, obtaining, for each LC panel, birefringence patterns for each of a plurality of perimeter segments of a perimeter of the occlusion area, and/or at 1014, obtaining birefringence patterns for an overall shape of the occlusion area. Next, method 1000 comprises, at 1016, producing the occlusion area by applying the birefringence patterns to the LC panels, and at 1018, displaying the virtual object in a location on a see-through display that is visually overlapping with the occlusion area from a vantage point of a user of the see-through display device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
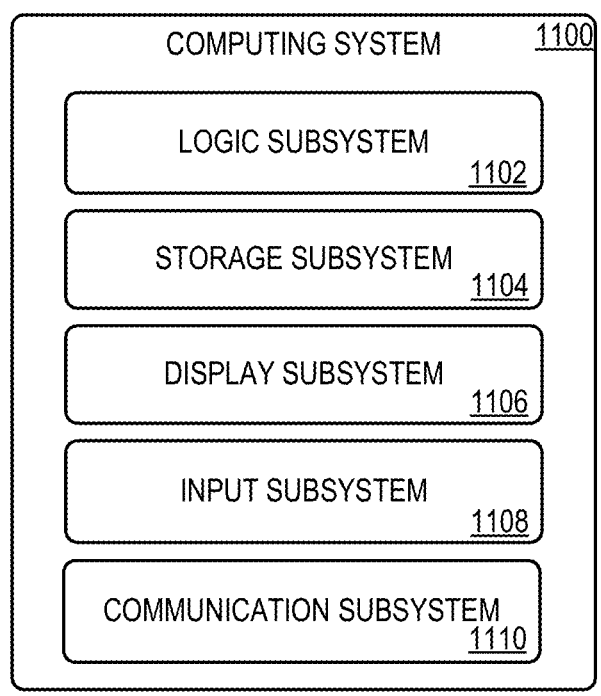
FIG. 11 shows a block diagram of an example computing system.

FIG. 11 schematically shows a non-limiting embodiment of a computing system 1100 that can enact one or more of the methods and processes described above. For example, computing system 1100 may be representative of computing device 220 shown in FIG. 2. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic subsystem 1102 and a storage subsystem 104. Computing system 1100 may optionally include a display subsystem 1106, input subsystem 1108, communication subsystem 1110, and/or other components not shown in FIG. 11.

Logic subsystem 1102 includes one or more physical devices configured to execute instructions. For example, logic subsystem 1102 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1102 may include one or more processors configured to execute software instructions. Additionally or alternatively, logic subsystem 1102 may include one or more hardware or firmware logic machines configured to execute hardware or firmware instructions. Processors of logic subsystem 1102 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of logic subsystem 1102 may be virtualized and executed by remotely accessible, networked computing devices configured in a cloud-computing configuration.

Storage subsystem 1104 includes one or more physical devices configured to hold instructions executable by the logic machine to implement the methods and processes described herein. When such methods and processes are implemented, the state of storage subsystem 1104 may be transformed—e.g., to hold different data.

Storage subsystem 1104 may include removable and/or built-in devices. Storage subsystem 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 may include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 1106 may be used to present a visual representation of data held by storage subsystem 1104. This visual representation may take the form of a graphical user interface (GUI), an augmented reality image, or other suitable generated image. As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic subsystem 1102 and/or storage subsystem 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

It will be understood that the configurations and/or approaches described herein are presented for the purpose of example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Another example provides a near-eye display system comprising a see-through display, an image source configured to produce images for display on the see-through display, a background light sensor configured to sense a brightness of a real-world background, a selective background occluder comprising a first liquid crystal panel and a second liquid crystal panel spaced from the first liquid crystal panel, the first liquid crystal panel and the second liquid crystal panel being positioned between a common pair of polarizers, and a computing device comprising a logic subsystem and a storage subsystem storing instructions executable by the logic subsystem to determine a shape and a position of an occlusion area based upon a virtual object to be displayed on the see-through display, obtain a first birefringence pattern for the first liquid crystal panel and a second birefringence pattern for the second liquid crystal panel based upon the shape and the position of the occlusion area, produce the occlusion area by applying the first birefringence pattern to the first liquid crystal panel and the second birefringence pattern to the second liquid crystal pattern, and display the virtual object in a location visually overlapping with the occlusion area. In this example, the instructions may additionally or alternatively be executable to obtain the first and second birefringence patterns by segmenting a perimeter of the occlusion area into perimeter segments, obtaining birefringence patterns for each of the perimeter segments, and constructing the first and second birefringence patterns from the birefringence patterns for the perimeter segments. The instructions may also additionally or alternatively be executable to obtain the first and second birefringence patterns by obtaining a birefringence pattern for an overall shape of the occlusion area. The background light sensor may additionally or alternatively comprise an image sensor configured to acquire an image of the real-world background, and the instructions may additionally or alternatively be executable to determine the shape and the position of the occlusion area by determining the shape and the position based at least partially on one or more brightness features in the image of the real-world background. The near-eye display system may additionally or alternatively comprise a gaze-tracking subsystem, and the instructions may additionally or alternatively be executable to track a gaze position of a user's eye via the gaze-tracking subsystem, and to determine the position of the occlusion area by determining the position based upon the gaze position. The instructions may also additionally or alternatively be executable to control a focus distance of the occlusion area by scaling the second birefringence pattern for the second liquid crystal panel based upon one or more of depth information and the gaze position. The instructions may also additionally or alternatively be executable to modify the first birefringence pattern on the first liquid crystal panel and modify the second birefringence pattern on the second liquid crystal panel to move the position of the occlusion area based upon a detected change in relative position of the virtual object and the real-world background. The near-eye display system may additionally or alternatively comprise a third liquid crystal panel positioned between the common pair of polarizers, and the instructions may additionally or alternatively be executable to obtain a third birefringence pattern for the third liquid crystal panel. In this example, the first liquid crystal panel and the second liquid crystal panel may each additionally or alternatively comprise a passive-matrix liquid crystal panel.

Another example provides, on a near-eye display system comprising a see-through display and a selective background occluder comprising a first liquid crystal panel and a second liquid crystal panel positioned between a common pair of polarizers, a method of selectively dimming light from one or more areas of a real-world background, the method comprising determining a shape and a position of an occlusion area based upon a virtual object to be displayed on the see-through display, obtaining a first birefringence pattern for the first liquid crystal panel and a second birefringence pattern for the second liquid crystal panel based upon the shape and the position of the occlusion area, producing the occlusion area by applying the first birefringence pattern to the first liquid crystal panel and the second birefringence pattern to the second liquid crystal pattern, and displaying the virtual object in a location visually overlapping with the occlusion area. The method may additionally or alternatively comprise obtaining the first birefringence pattern and the second birefringence pattern by segmenting a perimeter of the occlusion area into perimeter segments, obtaining birefringence patterns for the perimeter segments, and constructing the first and second birefringence patterns from the birefringence patterns for the perimeter segments. The method may additionally or alternatively comprise obtaining the first and second birefringence patterns by obtaining a birefringence pattern for an overall shape of the occlusion area. The method may additionally or alternatively comprise modifying the first birefringence pattern on the first liquid crystal panel and modifying the second birefringence pattern on the second liquid crystal panel to move the position of the occlusion area based upon a detected change in relative position of the virtual object and the real-world background. The method may additionally or alternatively comprise determining the shape and the position of the occlusion area by acquiring an image of the real-world background and determining the shape and the position based at least partially on one or more brightness features in the image of the real-world background. The method may additionally or alternatively comprise tracking a gaze position of a user's eye, and wherein determining the position of the occlusion area further comprises determining the position based upon the gaze position. The method may additionally or alternatively comprise controlling a focus distance of the occlusion area by scaling the second birefringence pattern for the second liquid crystal panel based upon one or more of depth information and the gaze position. The method may additionally or alternatively comprise, wherein the selective background occluder comprises a third liquid crystal panel positioned between the common pair of polarizers, obtaining a third birefringence pattern for the third liquid crystal panel.

Another example provides for a near-eye display system comprising a see-through display, an image source configured to produce images for display on the see-through display, a background light sensor configured to sense a brightness of a real-world background, a selective background occluder comprising a first liquid crystal panel and a second liquid crystal panel spaced from the first liquid crystal panel, the first liquid crystal panel and the second liquid crystal panel being positioned between a common pair of polarizers, and a computing device comprising a logic subsystem and a storage subsystem storing instructions executable by the logic subsystem to determine a shape of an occlusion area based upon a virtual object to be displayed via the see-through display, and operate the first liquid crystal panel and the second liquid crystal panel such that light passing through a first pixel of the first liquid crystal panel and a first pixel of the second liquid crystal panel is attenuated differently than light passing through the first pixel of the first liquid crystal panel and a second pixel of the second liquid crystal panel. In this example, the background light sensor may additionally or alternatively comprise an image sensor configured to acquire an image of the real-world background, and the instructions may additionally or alternatively be executable to determine the shape and the position of the occlusion area by determining the shape and the position based at least partially on one or more brightness features in the image of the real-world background. The instructions may also additionally or alternatively be executable to operate the first liquid crystal panel and the second liquid crystal panel by applying a first birefringence pattern to the first liquid crystal panel and a second birefringence pattern to the second liquid crystal panel based upon the shape and the position of the occlusion area.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A near-eye display system, comprising:
a see-through display;
an image source configured to produce images for display on the see-through display;
a selective background occluder comprising a first liquid crystal panel and a second liquid crystal panel spaced from the first liquid crystal panel, the first liquid crystal panel and the second liquid crystal panel being positioned between a common pair of polarizers, wherein the first liquid crystal panel is configured to rotate a polarization of incident light and the second liquid crystal panel is configured to rotate the polarization of incident light independently of the first liquid crystal panel; and
a computing device comprising a logic subsystem and a storage subsystem storing instructions executable by the logic subsystem to:
determine a shape and a position of an occlusion area based upon a shape and a position of a virtual object to be displayed on the see-through display,
obtain a first birefringence pattern for the first liquid crystal panel and a second birefringence pattern for the second liquid crystal panel based upon the shape and the position of the occlusion area,
produce the occlusion area by applying the first birefringence pattern to the first liquid crystal panel and the second birefringence pattern to the second liquid crystal panel, such that light passing through a first cell of the first liquid crystal panel and a first cell of the second liquid crystal panel is rotated a first combined rotation, and light passing through a second cell of the first liquid crystal panel and the first cell of the second liquid crystal panel produces a second combined rotation that is different from the first combined rotation, and
display the virtual object in a location visually overlapping with the occlusion area.

2. The near-eye display system of claim 1, wherein the instructions are further executable by the logic subsystem to obtain the first and second birefringence patterns by segmenting a perimeter of the occlusion area into perimeter segments, obtaining birefringence patterns for each of the perimeter segments, and constructing the first and second birefringence patterns from the birefringence patterns for the perimeter segments.

3. The near-eye display system of claim 1, wherein the instructions are further executable by the logic subsystem to obtain the first and second birefringence patterns by obtaining a birefringence pattern for an overall shape of the occlusion area.

4. The near-eye display system of claim 1, further comprising a background light sensor configured to sense a brightness of a real-world background, wherein the background light sensor comprises an image sensor configured to acquire an image of the real-world background, and wherein the instructions are further executable by the logic subsystem to determine the shape and the position of the occlusion area based at least partially on one or more brightness features in the image of the real-world background.

5. The near-eye display system of claim 1, further comprising a gaze-tracking subsystem, and wherein the instructions are further executable by the logic subsystem to track a gaze position of a user's eye via the gaze-tracking subsystem, and to determine the position of the occlusion area based upon the gaze position.

6. The near-eye display system of claim 5, wherein the instructions are further executable by the logic subsystem to control a focus distance of the occlusion area by scaling the second birefringence pattern for the second liquid crystal panel based upon one or more of depth information and the gaze position.

7. The near-eye display system of claim 1, wherein the instructions are further executable by the logic subsystem to modify the first birefringence pattern on the first liquid crystal panel and modify the second birefringence pattern on the second liquid crystal panel to move the position of the occlusion area based upon a detected change in relative position of the virtual object and a real-world background.

8. The near-eye display system of claim 1, further comprising a third liquid crystal panel positioned between the common pair of polarizers, the third liquid crystal panel configured to rotate the polarization of incident light independently of the first liquid crystal panel and the second liquid crystal panel, and wherein the instructions are further executable by the logic subsystem to obtain a third birefringence pattern for the third liquid crystal panel.

9. The near-eye display system of claim 1, wherein the first liquid crystal panel and the second liquid crystal panel each comprises a passive-matrix liquid crystal panel.

10. On a near-eye display system comprising a see-through display and a selective background occluder comprising a first liquid crystal panel and a second liquid crystal panel positioned between a common pair of polarizers, a method of selectively dimming light from one or more areas of a real-world background, the method comprising:
determining a shape and a position of an occlusion area based upon a shape and a position of a virtual object to be displayed on the see-through display;
obtaining a first birefringence pattern for the first liquid crystal panel and a second birefringence pattern for the second liquid crystal panel based upon the shape and the position of the occlusion area;
producing the occlusion area by applying the first birefringence pattern to the first liquid crystal panel and the second birefringence pattern to the second liquid crystal panel, the first liquid crystal panel configured to rotate a polarization of incident light and the second liquid crystal panel being configured to rotate the polarization of incident light independently of the first liquid crystal panel, such that light passing through a first cell of the first liquid crystal panel and a first cell of the second liquid crystal panel is rotated a first combined rotation, and light passing through a second cell of the first liquid crystal panel and the first cell of the second liquid crystal panel produces a second combined rotation that is different from the first combined rotation; and
displaying the virtual object in a location visually overlapping with the occlusion area.

11. The method of claim 10, wherein obtaining the first birefringence pattern and the second birefringence pattern comprises segmenting a perimeter of the occlusion area into perimeter segments, obtaining birefringence patterns for the perimeter segments, and constructing the first and second birefringence patterns from the birefringence patterns for the perimeter segments.

12. The method of claim 10, wherein obtaining the first and second birefringence patterns comprises obtaining a birefringence pattern for an overall shape of the occlusion area.

13. The method of claim 10, further comprising modifying the first birefringence pattern on the first liquid crystal panel and modifying the second birefringence pattern on the second liquid crystal panel to move the position of the occlusion area based upon a detected change in relative position of the virtual object and the real-world background.

14. The method of claim 10, wherein determining the shape and the position of the occlusion area comprises acquiring an image of the real-world background and determining the shape and the position of the occlusion area based at least partially on one or more brightness features in the image of the real-world background.

15. The method of claim 10, further comprising tracking a gaze position of a user's eye, and wherein determining the position of the occlusion area further comprises determining the position of the occlusion area based upon the gaze position.

16. The method of claim 15, further comprising controlling a focus distance of the occlusion area by scaling the second birefringence pattern for the second liquid crystal panel based upon one or more of depth information and the gaze position.

17. The method of claim 10, wherein the selective background occluder comprises a third liquid crystal panel positioned between the common pair of polarizers, the third liquid crystal panel configured to rotate the polarization of incident light independently of the first liquid crystal panel and the second liquid crystal panel, and further comprising obtaining a third birefringence pattern for the third liquid crystal panel.

18. A near-eye display system, comprising:
a see-through display;
an image source configured to produce images for display on the see-through display;
a selective background occluder comprising a first liquid crystal panel and a second liquid crystal panel spaced from the first liquid crystal panel, the first liquid crystal panel and the second liquid crystal panel being positioned between a common pair of polarizers, wherein the first liquid crystal panel is configured to rotate a polarization of incident light and the second liquid crystal panel is configured to rotate the polarization of incident light independently of the first liquid crystal panel; and
a computing device comprising a logic subsystem and a storage subsystem storing instructions executable by the logic subsystem to
determine a shape of an occlusion area based upon a shape of a virtual object to be displayed via the see-through display, and
operate the first liquid crystal panel and the second liquid crystal panel such that light passing through a first pixel of the first liquid crystal panel and a first pixel of the second liquid crystal panel is rotated a first combined rotation and is attenuated differently than light that is rotated a second combined rotation by passing through the first pixel of the first liquid crystal panel and a second pixel of the second liquid crystal panel.

19. The near-eye display system of claim 18, further comprising a background light sensor configured to sense a brightness of a real-world background, wherein the background light sensor comprises an image sensor configured to acquire an image of the real-world background, and wherein the instructions are further executable by the logic subsystem to determine the shape and a position of the occlusion area based at least partially on one or more brightness features in the image of the real-world background.

20. The near-eye display system of claim 19, wherein the instructions are further executable by the logic subsystem to operate the first liquid crystal panel and the second liquid crystal panel by applying a first birefringence pattern to the first liquid crystal panel and a second birefringence pattern to the second liquid crystal panel based upon the shape and the position of the occlusion area.

\* \* \* \* \*